United States Patent
Le Naour et al.

(10) Patent No.: US 12,056,864 B2
(45) Date of Patent: *Aug. 6, 2024

(54) METHOD AND DEVICE FOR OBTAINING A SECOND IMAGE FROM A FIRST IMAGE WHEN THE DYNAMIC RANGE OF THE LUMINANCE OF THE FIRST IMAGE IS GREATER THAN THE DYNAMIC RANGE OF THE LUMINANCE OF THE SECOND IMAGE

(71) Applicant: INTERDIGITAL VC HOLDINGS, INC., Wilmington, DE (US)

(72) Inventors: Robin Le Naour, Cesson Sévigné (FR); David Touze, Rennes (FR); Catherine Serre, Saint Gregoire (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/221,310

(22) Filed: Jul. 12, 2023

(65) Prior Publication Data
US 2023/0351561 A1 Nov. 2, 2023

Related U.S. Application Data

(63) Continuation of application No. 17/685,299, filed on Mar. 2, 2022, now Pat. No. 11,741,585, which is a
(Continued)

(30) Foreign Application Priority Data

Oct. 31, 2017 (EP) .................................. 17306493

(51) Int. Cl.
*G06T 5/00* (2006.01)
*G06T 5/50* (2006.01)
(Continued)

(52) U.S. Cl.
CPC ................. *G06T 5/92* (2024.01); *G06T 5/50* (2013.01); *H04N 19/186* (2014.11);
(Continued)

(58) Field of Classification Search
CPC ............. G06T 2207/20208; G06T 5/92; G06T 2207/10024; G06T 5/90; G06T 5/94;
(Continued)

(56) References Cited

U.S. PATENT DOCUMENTS 9,406,112 B2 8/2016 Banterle
11,301,971 B2 4/2022 Le Naour
(Continued)

FOREIGN PATENT DOCUMENTS

CN 107209928 A 9/2017
EP 3051489 A1 8/2016
(Continued)

OTHER PUBLICATIONS

H264 "Series H: Advanced video coding for generic audiovisual Services—Coding of moving video" Jan. 2012 (680 pages).
(Continued)

*Primary Examiner* — Quan M Hua
(74) *Attorney, Agent, or Firm* — Klintworth & Rozenblat IP LLP

(57) ABSTRACT

The present disclosure relates to a method and device for obtaining a second image from a first image when the dynamic range of the luminance of the first image is greater than the dynamic range of the luminance of the second image. The disclosure describes deriving at least one component representative of the colors of the second image from the first image, and maximizing at least one derived component according to a maximum value depending on a linear-light luminance component of the first image.

18 Claims, 8 Drawing Sheets

Related U.S. Application Data continuation of application No. 16/170,853, filed on Oct. 25, 2018, now Pat. No. 11,301,971.

(51) Int. Cl.

| | | |
|---|---|---|
| *G06T 5/92* | (2024.01) | |
| *H04N 19/186* | (2014.01) | |
| *H04N 19/85* | (2014.01) | |
| *H04N 19/86* | (2014.01) | |
| *H04N 19/98* | (2014.01) | |

(52) U.S. Cl.
CPC .............. *H04N 19/85* (2014.11); *H04N 19/86* (2014.11); *H04N 19/98* (2014.11); *G06T 2207/10024* (2013.01); *G06T 2207/20208* (2013.01)

(58) Field of Classification Search
CPC ... G06T 5/50; G06T 5/20; G06T 2207/10016; G06T 7/90; G06T 5/40; G06T 2207/20028; G06T 9/00; G06T 15/20; G06T 2207/20076; G06T 5/70; G06T 19/006; G06T 2207/20008; G06T 15/205; G06T 2207/20081; G06T 2207/20221; G06T 2207/20224; G06T 5/00; G06T 3/40; G06T 5/10; G06T 9/007; G06T 7/596; G06T 7/11; H04N 19/46; H04N 19/98; H04N 19/186; H04N 19/172; H04N 19/184; G06V 10/993; G06V 20/40; G06V 20/49

See application file for complete search history.

(56) References Cited

U.S. PATENT DOCUMENTS

| | | |
|---|---|---|
| 2008/0297460 A1 | 12/2008 | Peng |
| 2010/0157078 A1 | 6/2010 | Atanassov |
| 2010/0328490 A1 | 12/2010 | Kurane |
| 2014/0067733 A1 | 3/2014 | Humann |
| 2016/0309154 A1 | 10/2016 | Rusanovskyy |
| 2017/0142446 A1 | 5/2017 | Leleannec |
| 2017/0180759 A1 | 6/2017 | Mertens |
| 2017/0186141 A1 | 6/2017 | Ha |
| 2017/0249721 A1 | 8/2017 | Hirai |
| 2018/0350047 A1* | 12/2018 | Baar ......................... G06T 5/92 |
| 2018/0374202 A1* | 12/2018 | Cauvin ..................... G06T 5/92 |

FOREIGN PATENT DOCUMENTS

| | | |
|---|---|---|
| KR | 20170066217 | 6/2017 |
| WO | 2014056679 A1 | 4/2014 |
| WO | 2016120108 A1 | 8/2016 |
| WO | 2017157977 A1 | 9/2017 |

OTHER PUBLICATIONS

International Telecommunication Union, "Reference Software for ITU-T H.265 High Efficiency Video Coding". Series H: Audiovisual and Multimedia Systems; Infrastructure of Audiovisual Services—Coding of Moving Video, Recommendation ITU-T H.265.2, Oct. 2014, 12 pages.

Diaz et al., "Integrating HEVC Video Compression with a High Dynamic Range Video Pipeline", SMPTE Motion Imaging Journal, vol. 125, No. 1, Jan./Feb. 2016, pp. 14-21 (9 pages).

Kim, S. et al., "HEVC for high dynamic range services." In Applications of Digital Image Processing XXXVIII, vol. 9599, SPIE, 2015 (9 pages).

SMPTE Standard, "High Dynamic Range Electro-Optical Transfer Function of Mastering Reference Displays". Society for Motion Picture and Television Engineers (SMPTE), Aug. 16, 2014, pp. 1-14 (14 pages).

Lasserre, S et al., "Backward compatible HDR video compression system." In 2016 Data Compression Conference (DCC), pp. 309-318. IEEE, 2016 (10 pages).

François, E. et al., "A single-layer HDR video coding framework with SDR compatibility." SMPTE Motion Imaging Journal, Apr. 2017 pp. 16-22 (7 pages).

Herrou, G. et al., "HDR video quality evaluation of HEVC and VP9 codecs." 2016 Picture Coding Symposium (PCS), IEEE, 2016 (5 pages).

Haan, W. et. al., " Indication of SMPTE 2094-20 metadata in HEVC ". Joint Collaborative Team on Video Coding of ITU-T SG 16 WP 3 and ISO/IEC JTC 1/SC 29/WG 11, 23rd Meeting, San Diego, USA, Feb. 19-26, 2016, No. JCTVC-W0133 (5 pages).

* cited by examiner

METHOD AND DEVICE FOR OBTAINING A SECOND IMAGE FROM A FIRST IMAGE WHEN THE DYNAMIC RANGE OF THE LUMINANCE OF THE FIRST IMAGE IS GREATER THAN THE DYNAMIC RANGE OF THE LUMINANCE OF THE SECOND IMAGE

1. REFERENCE TO RELATED APPLICATION

This application s a continuation of U.S. patent application Ser. No. 17/685,299, titled "METHOD AND DEVICE FOR OBTAINING A SECOND IMAGE FROM A FIRST IMAGE WHEN THE DYNAMIC RANGE OF THE LUMINANCE OF THE FIRST IMAGE IS GREATER THAN THE DYNAMIC RANGE OF THE LUMINANCE OF THE SECOND IMAGE" and filed Mar. 2, 2022. Which is a continuation of U.S. patent application Ser. No. 16/170,853, titled "METHOD AND DEVICE FOR OBTAINING A SECOND IMAGE FROM A FIRST IMAGE WHEN THE DYNAMIC RANGE OF THE LUMINANCE OF SAID FIRST IMAGE IS GREATER THAN THE DYNAMIC RANGE OF THE LUMINANCE OF SAID SECOND IMAGE" and filed Oct. 25, 2018, which claims priority from European Patent Application No. EP 17306493.2 titled "METHOD AND DEVICE FOR OBTAINING A SECOND IMAGE FROM A FIRST IMAGE WHEN THE DYNAMIC RANGE OF THE LUMINANCE OF SAID FIRST IMAGE IS GREATER THAN THE DYNAMIC RANGE OF THE LUMINANCE OF SAID SECOND IMAGE" and filed on Oct. 31, 2017, the contents of each of which are hereby incorporated by reference in their entirety.

2. FIELD

The present principles generally relate to image/video processing. Particularly, but not exclusively, the technical field of the present principles are related to converting an image to another image whose luminance does not belong to a same dynamic range.

3. BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

In the following, an image contains one or several arrays of samples (pixel values) in a specific image/video format which specifies all information relative to the pixel values of an image (or a video) and all information which may be used by a display and/or any other device to visualize and/or decode an image (or video) for example. An image comprises a first component, in the shape of a first array of samples, representative of the luma or luminance of the image, and, possibly, a second and a third component, in the shape of arrays of samples, representative of the colors (chroma) of the image.

Standard-Dynamic-Range images (SDR images) are images whose luminance values are represented with a limited number of bits (most often 8 or 10). This limited representation does not allow correct rendering of small signal variations, in particular in dark and bright luminance ranges. In high-dynamic range images (HDR images), the signal representation is extended in order to maintain a high accuracy of the signal over its entire range. In HDR images, pixel values representing luminance levels are usually represented in floating-point format (either 32-bit or 16-bit for each component, namely float or half-float), the most popular format being openEXR half-float format (16-bit per RGB component, i.e. 48 bits per pixel) or in integers with a long representation, typically at least 16 bits.

In the following, the term "second image $I_2$" designates an image whose luminance values are represented with a second number of bits, and the term "first image $I_1$" designates an image whose luminance values are represented with a first number of bits. The first number of bits, i.e. the dynamic range of the luminance of the image $I_1$, is greater than the second number of bits, i.e. the dynamic range of the luminance of the second image $I_2$.

For example, an image $I_1$ may be 12-bits image and the second image $I_2$ may be an 8-bits image, or an image $I_1$ may be 16-bits image and the second image $I_2$ may be a 12-bits image.

In the following, the capital symbols, for example (C1, C2, C3), designate components of a first image $I_1$, and lower-case symbols, for example (c1, c2, c3), designate components of the second image $I_2$. Prime symbols, in the following, for example $$\left(Y' = Y^{\frac{1}{\gamma}}, U' = U^{\frac{1}{\gamma}}, V' = V^{\frac{1}{\gamma}}\right),$$

designate gamma-compressed components of a first image $I_1$ when those prime symbols are capital symbols and prime symbols, for example (y', u', v'), designate gamma-compressed components of a second image $I_2$ when those prime symbols are lower-case symbols.

Several examples exist to obtain a second image $I_2$ from a first image $I_1$ when the dynamic range of the luminance of said first image $I_1$ is greater than the dynamic range of the luminance of said second image $I_2$.

FIG. 1 depicts an example of a method for obtaining a second image $I_2$ from a first image $I_1$ when the dynamic range of the luminance of said first image $I_1$ is greater than the dynamic range of the luminance of said second image $I_2$.

In step 10, a first component c1 of the second image $I_2$ is obtained by applying a tone mapping function TM to the first component C1 of the first image $I_1$ in order to reduce the dynamic range of the luminance of said first image $I_1$.

In step 11, the second and third component c2 and c3 of the second image $I_2$ are derived by multiplying the second and third components C2 and C3 of the first image $I_1$ by a scaling factor that depends on the first component c1 of the second image $I_2$.

Sometimes, for some specific colors of the first image $I_1$, the derived second image $I_2$ produces colors that are more visible in the second image $I_2$ than in the first image $I_1$.

For example, when the first image $I_1$ is represented in the RGB color space, when the R and G components are neglectable (typically 0) compared to the B component (typically 0.01) in some areas of the first image $I_1$, the first image $I_1$ will look black or very close to black (with some flavors of blue) and the second image $I_2$ will look very blue in the same areas.

This may also occur when the B and G components are very low and the R component low but higher than the B and G components. In that case, the second image $I_2$ will look very red.

There is thus a need to fix this issue that introduces colors in the second image $I_2$ that are more visible in said second image $I_2$ than in the first image $I_1$.

4. SUMMARY

The following presents a simplified summary of the present principles in order to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

The present principles set out to remedy at least one of the drawbacks of the prior art with a method and a device for obtaining a second image from a first image when the dynamic range of the luminance of said first image is greater than the dynamic range of the luminance of said second image. The method comprises:

deriving at least one component representative of the colors of said second image from said first image; and
maximizing at least one derived component according to a maximum value depending on a linear-light luminance component of the first image.

According to an embodiment, the maximum value is proportional to the linear-light luminance component of the first image.

According to an embodiment, the second image being represented in the YUV color space, the maximum value also depends on a component representative of the luminance of the second image.

According to an embodiment, the linear-light luminance component being obtained from gamma-compressed components of the first image, a power of 2 is used to linearize said gamma-compressed components even when they have been gamma-compressed by using a value different of 2.

According to other of their aspects, the present principles also relate to a method and device for encoding a first image by encoding a second image obtained from said first image and metadata, and a computer program product comprising program code instructions to execute the steps of the above method when this program is executed on a computer.

According to yet another of their aspects, the present principles relate to a computer program product comprising program code instructions to execute the steps of a above method when this program is executed on a computer.

5. BRIEF DESCRIPTION OF DRAWINGS

In the drawings, examples of the present principles are illustrated. It shows:

Similar or same elements are referenced with the same reference numbers.

6. DESCRIPTION OF EXAMPLE OF THE PRESENT PRINCIPLES

Figure 1:
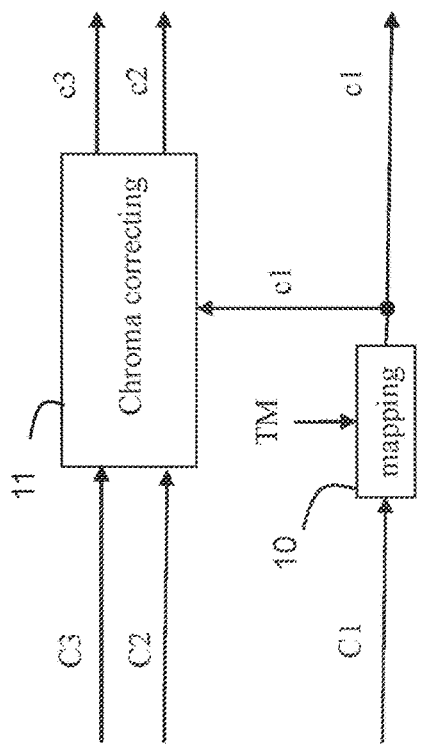
FIG. 1 depicts an example of a method for obtaining a second image from a first image when the dynamic range of the luminance of said first image is greater than the dynamic range of the luminance of said second image.

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims.

While not explicitly described, the present examples and variants may be employed in any combination or sub-combination.

The present principles are described for obtaining an image but extends to a sequence of images (video) because each image of the sequence is sequentially obtained as described below.

Figure 2:
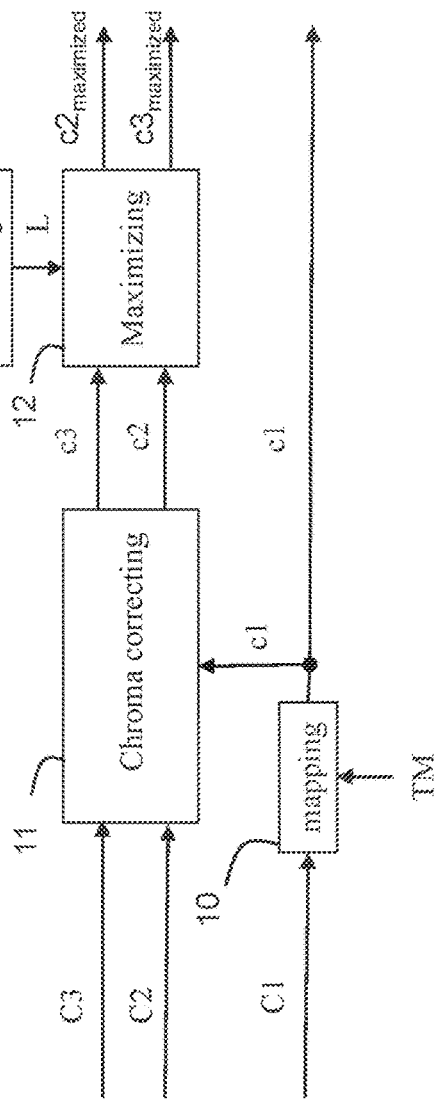
FIG. 2 depicts an example of a method for obtaining a second image from a first image when the dynamic range of the luminance of said first image is greater than the dynamic range of the luminance of said second image in accordance with an example of the present principles.

According to the present principles, illustrated in FIG. 2, the method of FIG. 1 further comprises maximizing (step 12) at least one component (c2 and/or c3) representative of the colors of the second image $I_2$ according to a maximum value MAX depending on a linear-light luminance component L of the first image $I_1$.

Maximizing a component of an image according to a maximum value applies a minimum between the value of said component and the maximum value MAX for each pixel of said image.

This maximum value MAX represents a higher bound that the component c2 and/or c3 can never exceed:

$$c2_{maximised} = \min(c2, MAX)$$

$$c3_{maximised} = \min(c3, MAX)$$

Note, that only one component c2 or c3 may be maximized and when both the two components c2 and c3 are maximized, the two, maximum values MAX may be different values.

Moreover, the maximum value MAX may be computed for each pixel of an image and thus depends on the luminance value of each pixel.

In a variant, the maximum value MAX is computed for a sub-set of pixels and a same value is applied to the pixels of said sub-set of pixels.

In step 13, the linear-light luminance component L is obtained from the components C1, C2 and C3 of the first image $I_1$.

According to an embodiment of step 13, the components C1, C2 and C3 are the RGB components, i.e. the first image $I_1$ is represented in the RGB color space. The linear-light luminance component L is then obtained by:

$$L = A_1 \begin{bmatrix} R \\ G \\ B \end{bmatrix} = [a1 \ b1 \ c1] \begin{bmatrix} R \\ G \\ B \end{bmatrix} \tag{1}$$

where (R,G,B) is a triplet of values of the first image $I_1$ represented in the RGB color space, and $A_1$=[a1 b1 c1] is the first row of coefficients of a conventional 3×3 matrix A=$[A_1 \ A_2 \ A_3]^T$, $A_1$, $A_2$, $A_3$ being 1×3 matrices, used to convert image values represented in a RGB color space to image values represented in a YUV color space.

According to another embodiment of step 13, the components C1, C2 and C3 are the gamma-compressed RGB components (R', G', B') given by:

$$R' = R^{1/\gamma}$$

$$G' = G^{1/\gamma}$$

$$B' = B^{1/\gamma}$$

with γ a real value, typically 2 or 2.4.

These gamma-compressed components have to be linearized (raised to the power of γ) to compute the linear-light luminance component L from equation (1):

$$R = R'^{\gamma}$$

$$G = G'^{\gamma}$$

$$B = B'^{\gamma}$$

Said linearization is easily implementable without requiring large computing resource when γ=2, because only a power of 2 is applied to the gamma-compressed components.

However, for other value γ (for example γ=2.4), the implementation of the linearization is more complex.

According to a variant, a power of 2 is used to linearized said gamma-compressed components (R', G', B') when they have been gamma-compressed by using a value different of 2, typically 2.4.

Using power of 2 instead of power of 2.4 have few impact on the linear-light luminance component L and at the end very few impact on the derived second image $I_2$.

The maximum value MAX used to maximize a component c2 (respectively c3) representative of the colors of the second image $I_2$ is obtained by assuming that the linear-light component B (respectively R) relative to the component C2 (respectively C3) representative of the colors of the first image $I_1$ equals the linear-light component b (respectively r) relative to the component c2 (respectively c3) in order to ensure that the derived second image $I_2$ could never have colors that are more visible than the first image $I_1$.

Said maximization of the component c2 (respectively c3) avoids any unwanted blueish (respectively reddish) colors in the second image $I_2$.

For example, the maximum value MAX for maximizing the component c2 (B=b) is given by:

$$\text{MAX} = \frac{L - a_l * R - b_l * G}{c_l} \quad (2a)$$

Assuming that the linear-light luminance component L is mainly provided by the B component of the first image $I_1$ (the R and G components are neglectable) equation (2a) is approximated by:

$$\text{MAX} = \frac{L}{c_l} \quad (2b)$$

The maximum value MAX is thus proportional to the values of the linear-light luminance component L.

According to another example, the maximum value MAX for maximizing the component c3 (R=r) is given by:

$$\text{MAX} = \frac{L - b_l * G - c_l * B}{a_l} \quad (3a)$$

Assuming that the linear-light luminance component L is mainly provided by the R component of the first image $I_1$ (the B and G components are neglectable) equation (3a) is approximated by:

$$\text{MAX} = \frac{L}{a_l} \quad (3b)$$

The maximum value MAX is thus proportional to the values of the linear-light luminance component L.

According to an embodiment, the second image $I_2$ is represented in the YUV color space, i.e. c1=y, c2=u and c3=v.

The u and v components are representative of the second image $I_2$.

The linear-light component b of the second image $I_2$ is now given by:

$$b = M_3 \begin{bmatrix} y \\ u \\ v \end{bmatrix} = a_b * y + b_b * u + c_b * v$$

with $M_3 = [a_b, b_b, c_b]$ is the third row of coefficients of a conventional matrix M used to convert image values represented in a YUV color space to image values represented in a RGB color space.

The matrix M is typically given by:

$$M = \begin{bmatrix} ar & br & cr \\ ag & bg & cg \\ ab & bb & cb \end{bmatrix}$$

When the BT.2020 or BT.709 color gamuts are used, the matrix M is given by:

$$M = \begin{bmatrix} 1 & 0 & cr \\ 1 & bg & cg \\ 1 & bb & 0 \end{bmatrix}$$

When the BT.2020 color gamut is used, the matrix M equals:

$$M = \begin{bmatrix} 1 & 0 & 1.4746 \\ 1 & -0.16455 & -0.57135 \\ 1 & 1.8814 & 0 \end{bmatrix}$$

When the BT.709 color gamut is used, the matrix M equals:

$$M = \begin{bmatrix} 1 & 0 & 1.5748 \\ 1 & -0.18733 & -0.46813 \\ 1 & 1.85563 & 0 \end{bmatrix}$$

The maximum value is now computed (b=B) by:

$$\text{MAX} = \frac{\frac{L - a_l * R - b_l * G}{c_l} - a_b * y - c_b * v}{b_b} \quad (4a)$$

The maximum value MAX depends thus the linear-light luminance component L and the first component y representative of the luminance of the second image $I_2$.

Assuming that the linear-light luminance component L is mainly provided by the B component of the first image $I_1$ (the R and G components are neglectable) equation (4a) is approximated by:

$$\text{MAX} = \frac{\frac{L}{c_l} - a_b * y - c_b * v}{b_b} \quad (4b)$$

The maximum value MAX depends thus the linear-light luminance component L and the first component y representative of the luminance of the second image $I_2$.

When the BT.709 or BT.2020 color gamuts are considered, equation (4a) becomes:

$$\text{MAX} = \frac{\frac{L - a_l * R - b_l * G}{c_l} - y}{b_b} \quad (5a)$$

The maximum value MAX depends thus the linear-light luminance component L and the first component y representative of the luminance of the second image $I_2$.

Equation (4b) becomes:

$$\text{MAX} = \frac{\frac{L}{c_l} - y}{b_b} \quad (5b)$$

The maximum value MAX depends thus the linear-light luminance component L and the first component y representative of the luminance of the second image $I_2$.

The linear-light component r of the second image $I_2$ is now given by:

$$r = M_1 \begin{bmatrix} y \\ u \\ v \end{bmatrix} = a_r * y + b_r * u + c_r * v$$

with $M_1 = [a_r \; b_r \; c_r]$ is the first row of coefficients of the conventional matrix M.

The maximum value is now computed (r=R) by:

$$MAX = \frac{\frac{L - b_l * G - c_l * B}{a_l} - a_r * y - b_r * u}{c_r} \quad (6a)$$

The maximum value MAX depends thus the linear-light luminance component L and the first component y representative of the luminance of the second image $I_2$.

Assuming that the linear-light luminance component L is mainly provided by the R component of the first image $I_1$ (the B and G components are neglectable) equation (4a) is approximated by:

$$MAX = \frac{\frac{L}{a_l} - a_r * y - b_r * u}{c_r} \quad (6b)$$

The maximum value MAX depends thus the linear-light luminance component L and the first component y representative of the luminance of the second image $I_2$.

When the BT.709 or BT.2020 color gamuts are considered, equation (6a) becomes:

$$MAX = \frac{\frac{L - b_l * G - c_l * B}{a_l} - y}{c_t} \quad (7a)$$

The maximum value MAX depends thus the linear-light luminance component L and the first component y representative of the luminance of the second image $I_2$.

Equation (6b) becomes:

$$MAX = \frac{\frac{L}{a_l} - y}{c_r} \quad (7b)$$

The maximum value MAX depends thus the linear-light luminance component L and the first component y representative of the luminance of the second image $I_2$.

The maximum value MAX relies on the fact that the linear-light luminance component L is mainly provided by the B component, respectively R component, of the HDR image, i.e. if the R, respectively B, and G component are neglectable.

If said components are not neglectable, the linear-light luminance component L will be far higher (equation 1).

Consequently, when said components are neglectable, the maximum value MAX (equations 2b, 3b, 4b, 5b, 6b or 7b) is a relevant value because maximizing the components representative of the colors of the second image $I_2$ avoids unwanted colors in block areas of the second image $I_2$, and when said components become not neglectable, the maximum values MAX reach very high levels (equations 2a, 3a, 4a, 5a, 6a and 7a) leading to no maximization of the components representative of the colors of the second image $I_2$.

This guarantees that the maximization of the components representative of the colors of the second image $I_2$ only applies when the linear-light luminance component L is mainly provided by a single component representative of the colors of the first image h.

The method as described in reference with FIG. 2 may be used in various applications when a second image must be obtained from a first image and when the dynamic range of the luminance of said first image is greater than the dynamic range of the luminance of said second image.

Some applications are those relative to the high-dynamic range content as defined by the High Efficiency Video Coding (HEVC) standard (*ITU-T H.265 Telecommunication standardization sector of ITU* (10/2014), *series H: audiovisual and multimedia systems, infrastructure of audiovisual services—coding of moving video, High efficiency video coding, Recommendation ITU-T H.265*) that enables the deployment of new video services with enhanced viewing experience, such as Ultra HD broadcast services. In addition to an increased spatial resolution, Ultra HD can bring a wider color gamut (WCG) and a higher dynamic range (HDR) than the Standard dynamic range (SDR) HD-TV currently deployed. Different solutions for the representation and coding of HDR/WCG video have been proposed (SMPTE 2014. "High Dynamic Range Electro-Optical Transfer Function of Mastering Reference Displays, or SMPTE ST 2084, 2014, or Diaz, R., Blinstein, S. and Qu, S. "Integrating HEVC Video Compression with a High Dynamic Range Video Pipeline", SMPTE Motion Imaging Journal, Vol. 125, Issue 1. February 2016, pp 14-21).

Figure 3:
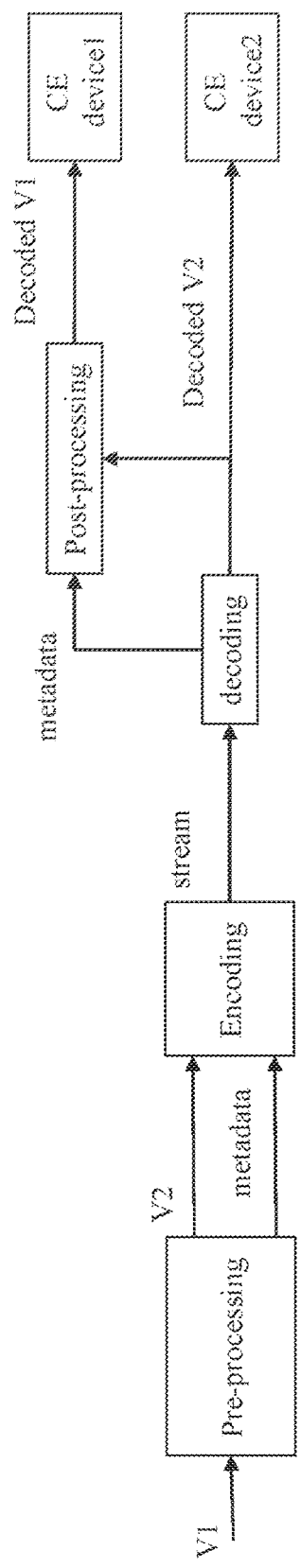
FIG. 3 shows an end-to-end workflow supporting content production and delivery to displays having different peak luminance.

FIG. 3 shows an example of a end-to-end workflow supporting content production and delivery to displays having different peak luminance.

At a pre-processing stage, an incoming video V1 is decomposed in a video V2 and metadata. The dynamic range of the luminance of said video V1 is greater than the dynamic range of the luminance of said video V2.

The video V2 is then encoded with any legacy codec and an bitstream is carried throughout an existing legacy distribution network with accompanying metadata conveyed on a specific channel or embedded in the bitstream.

Preferably, the video coded is a HEVC codec such as the H265/HEVC codec or H264/AVC ("Advanced video coding for generic audiovisual Services". SERIES H: AUDIOVISUAL AND MULTIMEDIA SYSTEMS: Recommendation IT U-T H.264, Telecommunication Standardization Sector of ITU, January 2012).

The metadata are typically carried by SEI messages when used in conjunction with an HEVC or H264/AVC codec such as the HEVC Colour Remapping Information (CRI) or Mastering Display Colour Volume (MDCV) SEI message.

The bitstream is decoded and a decoded video V2 is then available for a Consumer Electronics (CE) display.

Next, at a post-processing stage, which is functionally the inverse of the pre-processing stage, the video V1 is reconstructed from the decoded video V2 and metadata obtained from a specific channel or from the bitstream.

Figure 4:
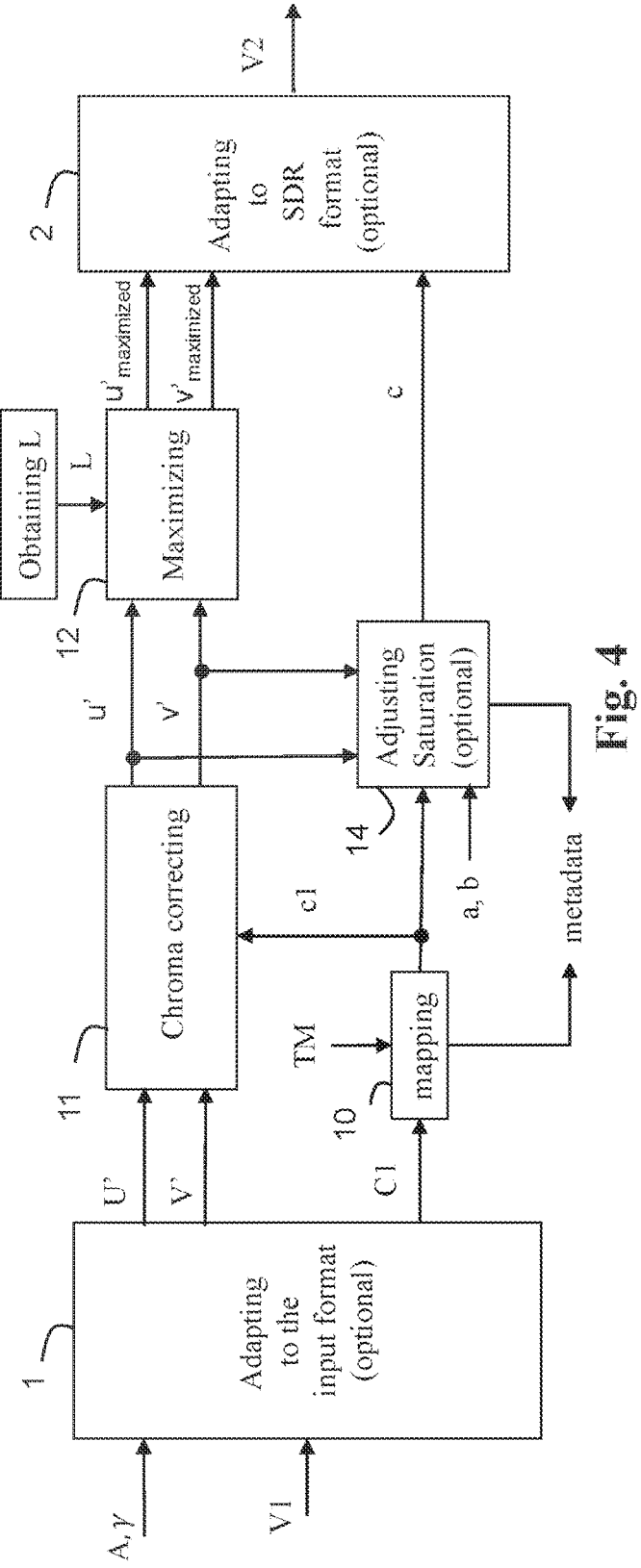
FIG. 4 shows a diagram of the sub-steps of an embodiment to decompose a video V1 in a video V2 and metadata in accordance with an example of the present principles.

This is a single layer encoding/decoding scheme that is adapted to all distribution workflows because a single stream may be transmitted (including metadata) while allowing backward compatibility with legacy CE devices, FIG. 4 shows a diagram of the sub-steps of an embodiment to decompose the video V1 in the video V2 and metadata in accordance with an example of the present principles.

An image of the video V1 is the first image $I_1$ of FIG. 2 and an image of the video V2 is the second image $I_2$ of FIG. 2.

Optionally, in step 1 the format of the first image $I_1$ may be adapted to a specific input format (C1, U', V) and in step 2, the format (y', u'$_{maximized}$, v'$_{maximized}$) of the second image $I_2$ may also be adapted to a specific output format.

Said input/output format adaptation steps (1, 2) may include color space conversion and/or color gamut mapping. Usual format adapting processes may be used such as RGB-to-YUV or YUV-to-RGB conversion. BT.709-to-BT.2020 or BT.2020-to-BT.709, down-sampling or up-sampling chroma components, etc. Note that the well-known YUV color space refers also to the well-known YCbCr in the prior art.

In step 10, a first component c1 of the second image $I_2$ is obtained by mapping a first component C1 of the first image $I_1$:

$$c_1 = TM(C1)$$

with TM being a luminance mapping function.

In step 11, a second and third component u', v' of the second image $I_2$ are derived by correcting the first and second components U', V' according to the first component $c_1$.

The correction of the chroma components may be maintain under control by tuning the parameters of the mapping. The color saturation and hue are thus under control.

According to an embodiment of step 11, the second and third components U' and V' are divided by a scaling function $\beta_0(c_1)$ whose value depends on the first component $c_1$.

Mathematically speaking, the two first and second components u', v' are given by:

$$\begin{bmatrix} u' \\ v' \end{bmatrix} = \frac{1}{\beta_0(c_1)} \cdot \begin{bmatrix} U' \\ V' \end{bmatrix}$$

Note that $\beta_0$ may be a pre-processed colour correction Look-Up-Table indexed by luminance values.

Optionally, in step 14, the first component $c_1$ may be adjusted to further control the perceived saturation, as follows:

$$c = c_1 - \max(D, a.u' + b.v')$$

where a and b are two pre-defined parameters. As an example, a=0 and b=0.1.

This step 14 allows to control the luminance of the second image $I_2$ in order to guarantee the perceived color matching between the colors of the second image $I_2$ and the colors of the first image $I_1$.

The Inventors observe that producing colors that are more visible in the second image $I_2$ than in the first image $I_1$ may come from the fact that second and third components U' and V' are divided by the scaling function $\beta_0(c_1)$ whose value depends on the first component $c_1$. Thus, because the scaling function $\beta_0(c_1)$ may be very low when the first component $c_1$ is low, multiplying the second component U (and V) by the inverse of said scaling function $\beta_0(c_1)$ leads to very high values for those components, resulting in the second image $I_2$ in which blue colors appears as positive values of the second component U' (a.k.a Cb chroma component) correspond to the blueish part of the color spectrum, and in which red colors appears as positive values of the third component V' (a.k.a Cr chroma component) correspond to the reddish part of the color spectrum. This is also emphasis by the fact that real implementations of such codec involve approximations (such as integer implementation, LUT interpolation . . . ).

Those artifacts are removed by maximizing (step 12) at least one of the component u' and v' representative of the colors of the second image $I_2$ according to a maximum value MAX as described in FIG. 2. The components (c: u'$_{maximized}$, v'$_{maximized}$) form the second image $I_2$.

Figure 5:
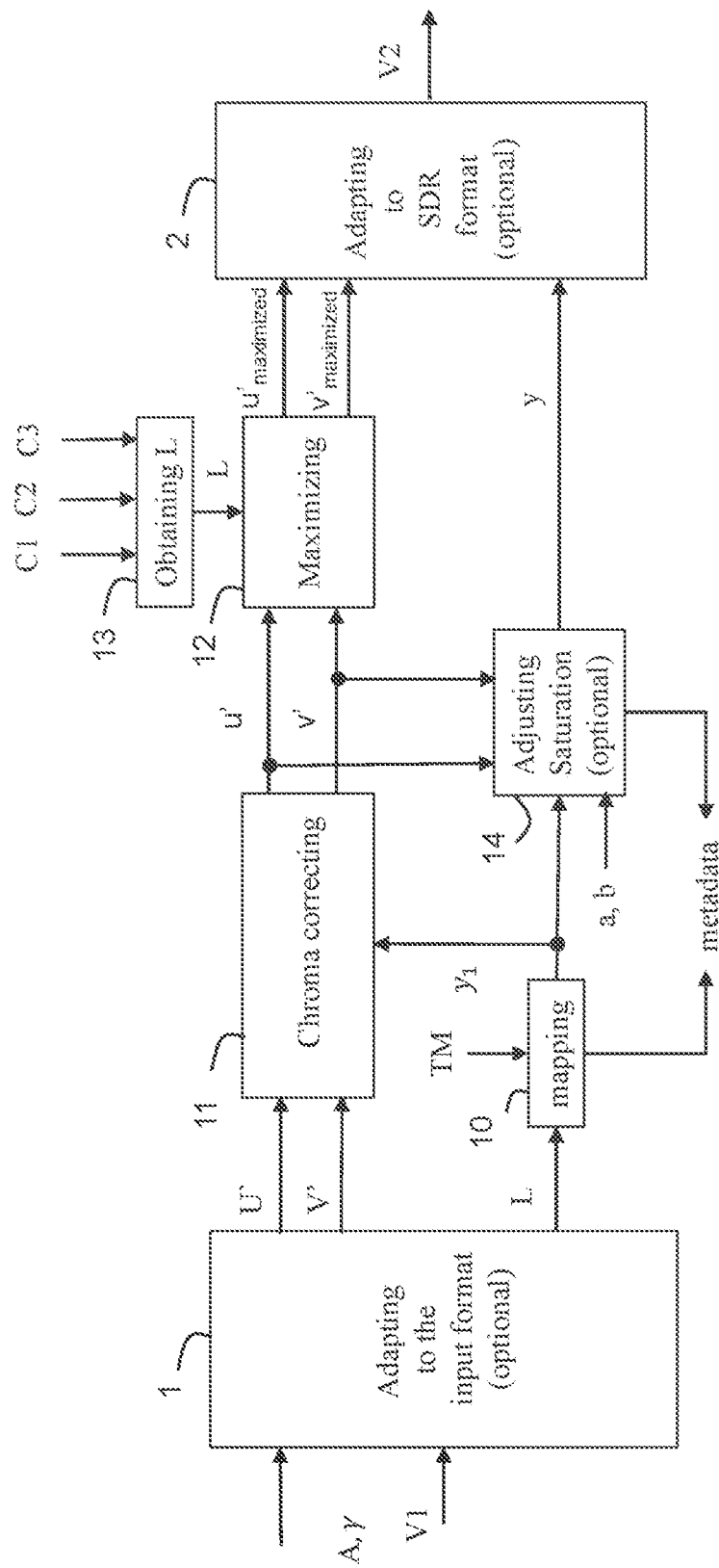
FIG. 5 shows a diagram of a first embodiment of the method of FIG. 4.

According to a first embodiment of the method of FIG. 4, as illustrated in FIG. 5, in step 1, the first component C1 of the first image $I_1$ is a linear-light luminance component L obtained from the RGB component of the first image $I_1$ by:

$$C1 = L = A_1 \begin{bmatrix} R \\ G \\ B \end{bmatrix}$$

and to derive a second and third component U', V' by applying a pseudo-gammatization using square-root (close to BT.709 OETF) to the RGB components of the first image $I_1$:

$$\begin{bmatrix} U' \\ V' \end{bmatrix} = \begin{bmatrix} A_2 \\ A_3 \end{bmatrix} \begin{bmatrix} \sqrt{R} \\ \sqrt{G} \\ \sqrt{B} \end{bmatrix} \times 1024$$

In step 10, the first component $y_1$ of the second image $I_2$ is obtained by mapping said linear-light luminance component L:

$$y_1 = TM(L)$$

In step 11, the second and third component u', v' of the second image $I_2$ are derived by correcting the first and second components U', V' according to the first component $y_1$.

Figure 6:
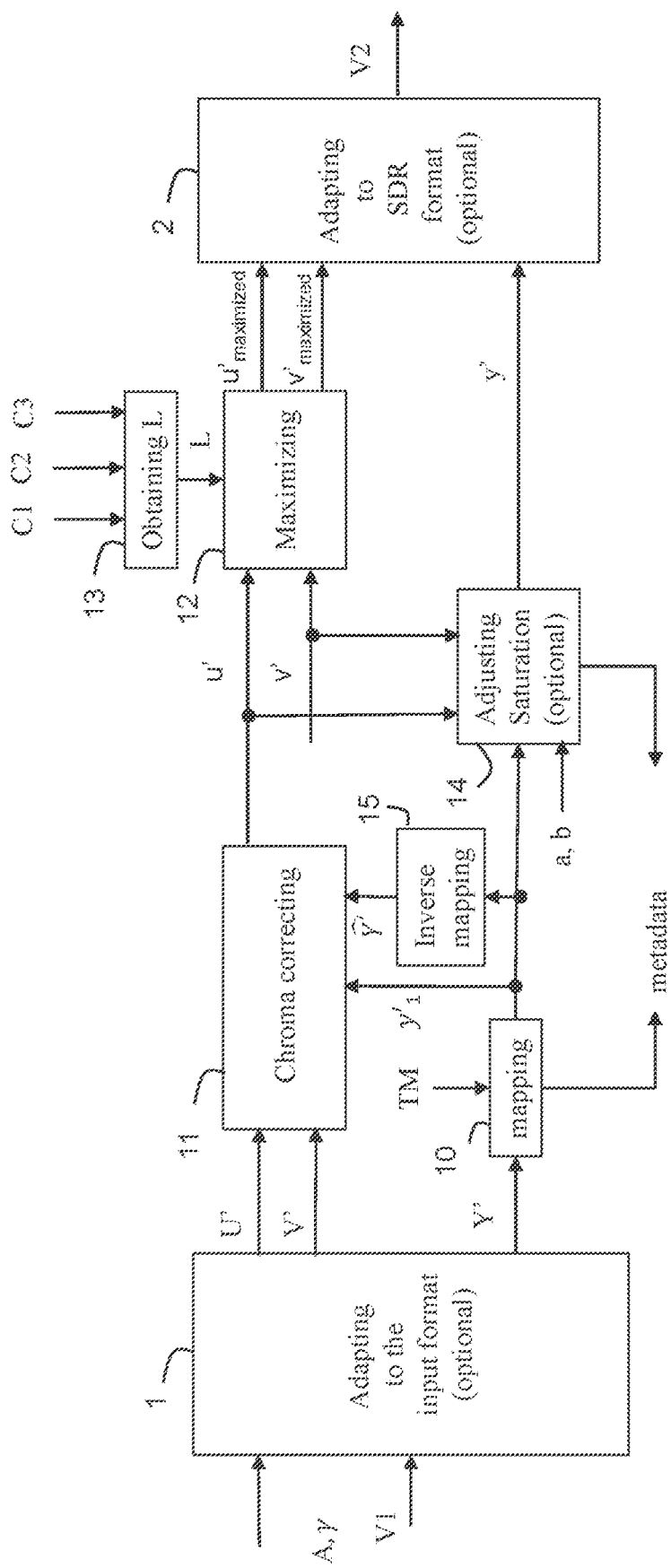
FIG. 6 shows a diagram of a second embodiment of the method of FIG. 4.

According to a second embodiment of the method of FIG. 4, as illustrated in FIG. 6, in step 1, the first component C1 of the first image I1 is a component Y' obtained from the gamma-compressed RGB components of the first image $I_1$ by:

$$Y' = A_1 \begin{bmatrix} R' \\ G' \\ B' \end{bmatrix}$$

and to derive a second and third component U', V' by applying a gammatization to the RGB components of the first image $I_1$:

$$\begin{bmatrix} U' \\ V' \end{bmatrix} = \begin{bmatrix} A_2 \\ A_3 \end{bmatrix} \begin{bmatrix} R' \\ G' \\ B' \end{bmatrix} * 1024$$

where $\gamma$ may be a gamma factor, preferably equal to 2.4.

Note, the component Y' which is a non-linear signal, is different of the linear-light luminance component L.

In step 10, the first component $y'_1$ of the second image $I_2$ is obtained by mapping said component Y'.

$$y'_1 = TM(Y')$$

In step 15, a reconstructed component $\hat{Y}'$ is obtained by inverse-mapping the first component $y'_1$:

$$\hat{Y}' = ITM(y'_1)$$

where ITM is the inverse of the luminance mapping function TM.

The values of the reconstructed component $\hat{Y}'$ belong thus to the dynamic range of the values of the component Y'.

In step 11, a second and third component u', v' of the second image $I_2$ are derived by correcting the first and second components U', V' according to the first component y', and the reconstructed HDR luma component $\hat{Y}'$.

This step 11 allows to control the SDR colors and guarantees their matching to the HDR colors.

The correction of the chroma components may be maintain under control by tuning the parameters of the mapping (inverse mapping). The color saturation and hue are thus under control Such a control is not possible, usually, when a non-parametric perceptual transfer function is used.

According to an embodiment of step 11, the scaling function $\beta_0(y'_1)$ depends on the ratio of the reconstructed component $\hat{Y}'$ over the component $y'_1$:

$$\beta_0(y'_1) = \frac{ITM(y'_1) \cdot \Omega}{y'_1} = \frac{\hat{Y}' \cdot \Omega}{y'_1}$$

with $\Omega$ is constant value depending on the color primaries of the HDR image (equals to 1.3 for BT.2020 for example).

The luminance mapping function TM is based on a perceptual transfer function, whose the goal is to convert a component of a first image $I_1$ into a component of a second image $I_2$, thus reducing the dynamic range of the values of their luminance. The values of a component of a second image $I_2$ belong thus to a lower dynamic range than the values of the component of a first image $I_1$.

Said perceptual transfer function TM uses a limited set of control parameters.

Figure 7:
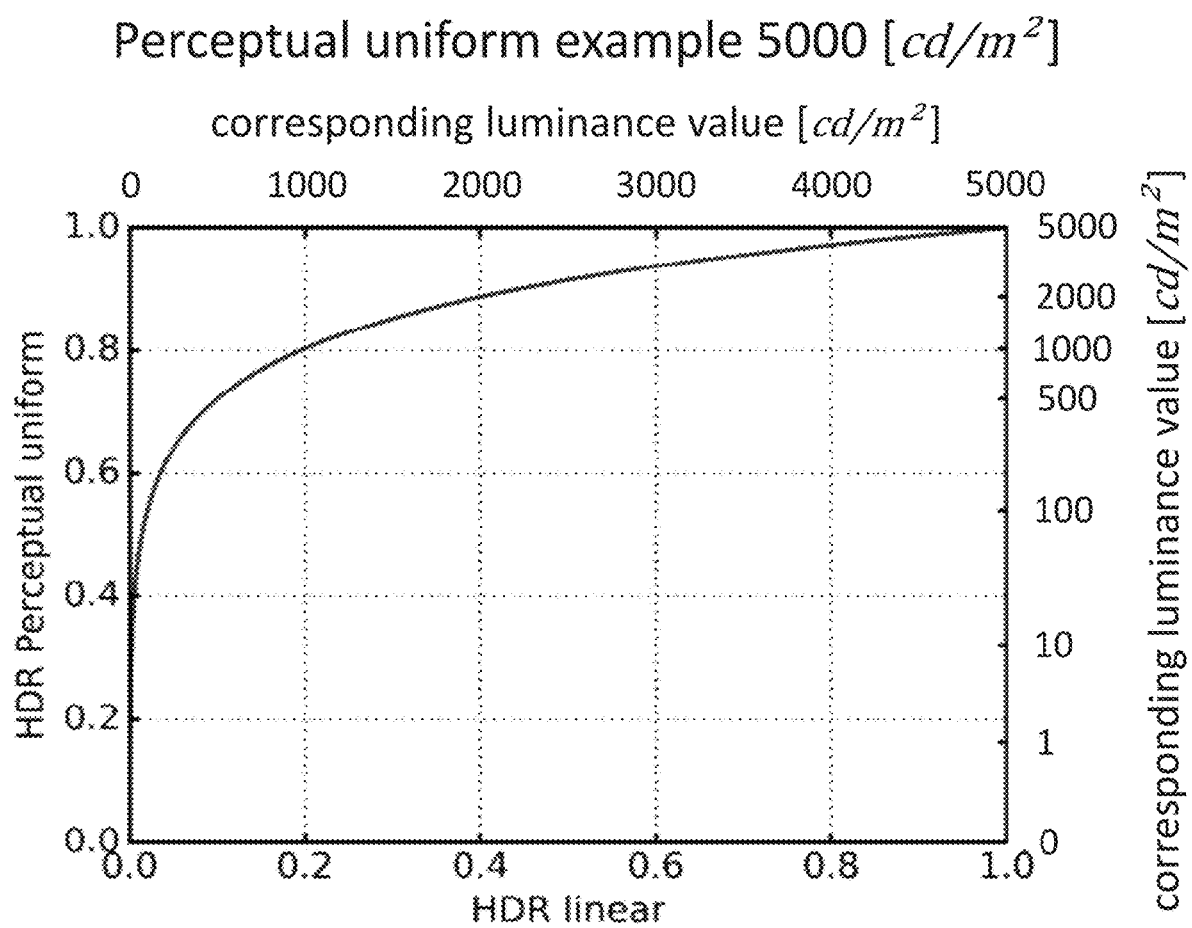
FIG. 7 shows an illustration of a perceptual transfer function.

FIG. 7 shows an illustration of a perceptual transfer function which may be used for mapping luminance components but a similar perceptual transfer function for mapping luma components may be used.

Figure 8:
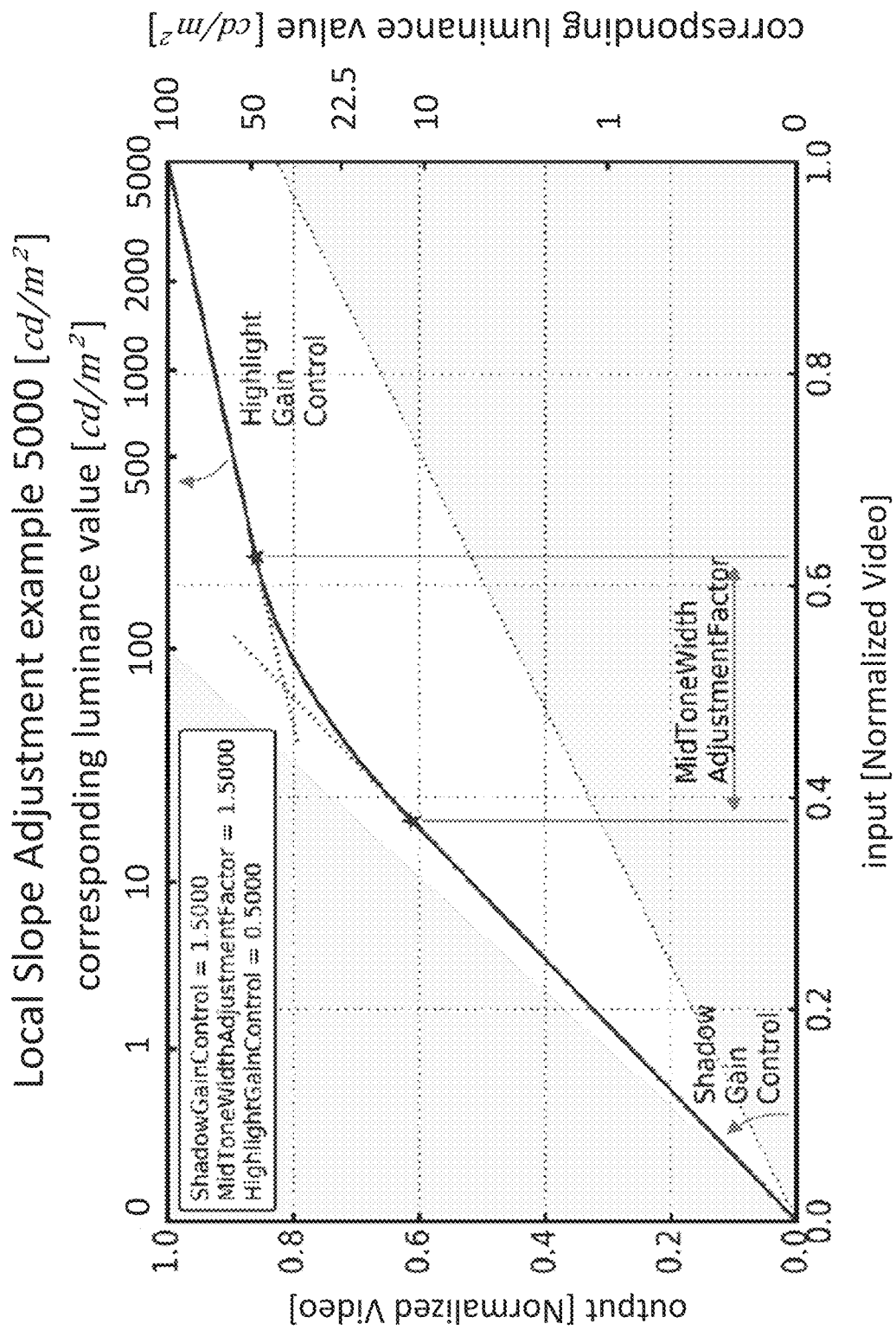
FIG. 8 shows an example of a piece-wise curve used for mapping.

The mapping is controlled by a mastering display peak luminance parameter (equal to 5000 cd/m² in FIG. 7). To better control the black and white levels, a signal stretching between content-dependent black and white levels is applied. Then the converted signal is mapped using a piece-wise curve constructed out of three parts, as illustrated in FIG. 8. The lower and upper sections are linear, the steepness being determined by the shadowGain and highlightGain parameters respectively. The mid-section is a parabola providing a smooth bridge between the two linear sections. The width of the cross-over is determined by the mid ToneWidthAdjFactor parameter.

All the parameters controlling the mapping may be conveyed as metadata for example by using a SEI message as defined in JCTVC-W0133 to carry the SMPTE ST 2094-20 metadata.

Figure 9:
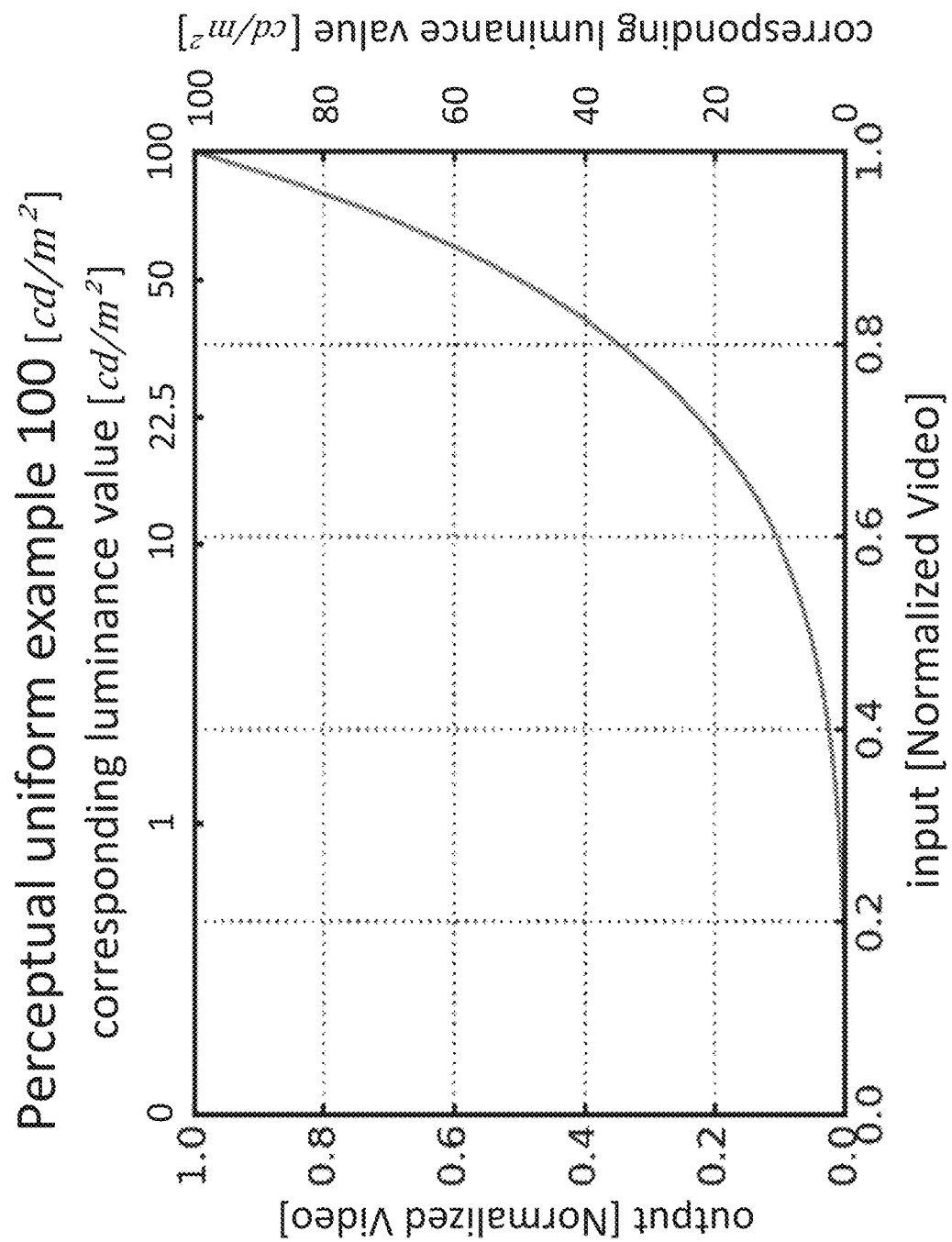
FIG. 9 shows an example of a curve used for converting back a signal to a linear light domain.

FIG. 9 shows an example of the inverse of the perceptual transfer function TM (FIG. 7) to illustrate how a perceptual optimized video signal may be converted back to the linear light domain based on a targeted legacy display maximum luminance, for example 100 cd/m².

On FIG. 1-9, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the present principles are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a device or from a blend of hardware and software components.

Figure 10:
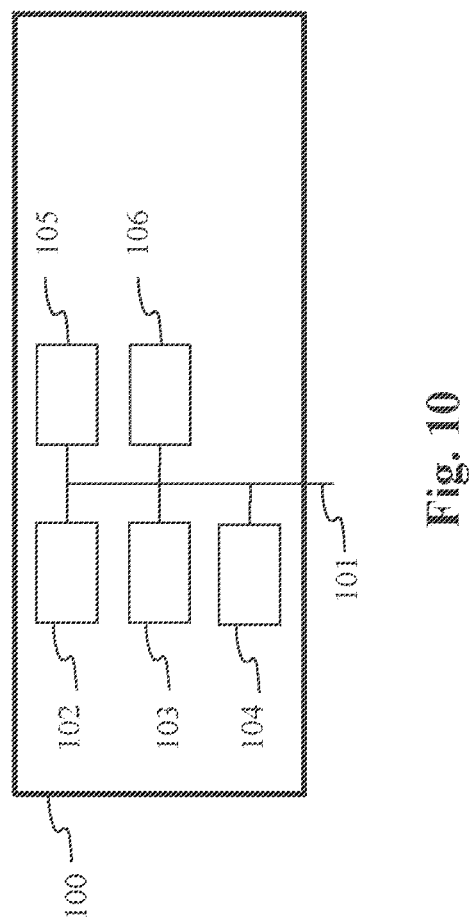
FIG. 10 shows an example of an architecture of a device in accordance with an example of present principles.

FIG. 10 represents an exemplary architecture of a device 100 which may be configured to implement a method described in relation with FIG. 1-9.

Device 100 comprises following elements that are linked together by a data and address bus 101:
- a microprocessor 102 (or CPU), which is, for example, a DSP (or Digital Signal Processor);
- a ROM (or Read Only Memory) 103;
- a RAM (or Random Access Memory) 104;
- an I/O interface 105 for reception of data to transmit, from an application; and
- a battery 106.

In accordance with an example, the battery 106 is external to the device. In each of mentioned memory, the word «register» used in the specification can correspond to area of small capacity (some bits) or to very large area (e.g. a whole program or large amount of received or decoded data) The ROM 103 comprises at least a program and parameters. The ROM 103 may store algorithms and instructions to perform techniques in accordance with present principles. When switched on, the CPU 102 uploads the program in the RAM and executes the corresponding instructions.

RAM 104 comprises, in a register, the program executed by the CPU 102 and uploaded after switch on of the device 100, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with an example of encoding or an encoder, the video V1 or a first image $I_1$ of V1 is obtained from a source. For example, the source belongs to a set comprising:
- a local memory (103 or 104), e.g. a video memory or a RAM (or Random Access Memory), a flash memory, a ROM (or Read Only Memory), a hard disk;
- a storage interface (105), e.g. an interface with a mass storage, a RAM, a flash memory, a ROM, an optical disc or a magnetic support,
- a communication interface (105), e.g. a wireline interface (for example a bus interface, a wide area network interface, a local area network interface) or a wireless interface (such as a IEEE 802.11 interface or a Bluetooth® interface): and an image capturing circuit (e.g. a sensor such as, for example, a CCD (or Charge-Coupled Device) or CMOS (or Complementary Metal-Oxide-Semiconductor)).

In accordance with examples of encoding or encoder, the bitstream and/or the other bitstream carrying the metadata are sent to a destination. As an example, one of these bitstream or both are stored in a local or remote memory, e.g. a video memory (104) or a RAM (104), a hard disk (103). In a variant, the bitstreams is sent to a storage interface (105), e.g. an interface with a mass storage, a flash memory, ROM, an optical disc or a magnetic support and/or transmitted over a communication interface (105), e.g. an interface to a point to point link, a communication bus, a point to multipoint link or a broadcast network.

In accordance with examples, device 100 being configured to implement an encoding method as described above, belongs to a set comprising:
a mobile device;
a communication device;
a game device;
a tablet (or tablet computer);
a laptop;
a still image camera;
a video camera;
an encoding chip;
a still image server; and
a video server (e.g. a broadcast server, a video-on-demand server or a web server).

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and any other device for processing a image or a video or other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art, a portable computer diskette; a hard disk; a read-only memory (ROM); an erasable programmable read-only memory (EPROM or Flash memory); a portable compact disc read-only memory (CD-ROM); an optical storage device, a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described example of the present principles, or to carry as data the actual syntax-values written by a described example of the present principles. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
obtaining second image data from first image data, wherein a dynamic range of a luminance component of the first image data is greater than a dynamic range of a luminance component of the second image data, wherein obtaining comprises:
deriving a first component of the second image data by applying a tone mapping function to a first component of the first image data, wherein the first component of the first image data is representative of a first linear light luminance, and wherein the first component of the second image data is representative of a second linear light luminance; and
deriving, based on the first component of the first image data, a second component of the second image data and a third component of the second image data by multiplying information representative of a second component of the first image data and information representative of a third component of the first image data, respectively, by a scaling factor that depends on a result of applying an inverse tone mapping function to information representative of the first component of the second image data, the inverse tone mapping function being representative of an inverse of the tone mapping function.

2. The method of claim 1, wherein deriving the second component of the second image data and the third component of the second image data comprises maximizing the second component of the second image data and the third component of the second image data according to a maximum value depending on the first component of the second image data, wherein the maximum value is proportional to the first component of the second image data.

3. The method of claim 2, wherein the maximum value further depends on the first component of the second image data.

4. The method of claim 1, wherein the first component of the first image data is obtained from gamma-compressed components of the first image data, and wherein a power of two is used to linearize the gamma-compressed components when the gamma-compressed components were gamma-compressed using a value different from two.

5. The method of claim 1, wherein the first image data is encoded in a form of the second image data obtained from the first image data and metadata.

6. The method of claim 1, wherein the first image data and the second image data are in YUV format, each first component is a luminance component, each second component is a first chrominance component, and each third component is a second chrominance component.

7. A device comprising at least one processor and at least one memory having stored instructions operative, when executed by the at least one processor, to cause the device to:
obtain second image data from first image data, wherein a dynamic range of a luminance component of the first image data is greater than a dynamic range of a luminance component of the second image data, wherein obtaining comprises:
deriving a first component of the second image data by applying a tone mapping function to a first component of the first image data, wherein the first component of the first image data is representative of a first linear light luminance, and wherein the first component of the second image data is representative of a second linear light luminance; and
deriving, based on the first component of the first image data, a second component of the second image data and a third component of the second image data by multiplying information representative of a second component of the first image data and information representative of a third component of the first image data, respectively, by a scaling factor that depends on a result of applying an inverse tone mapping function to information representative of the first component of the second image data, the inverse tone mapping function being representative of an inverse of the tone mapping function.

8. The device of claim 7, wherein deriving the second component of the second image data and the third component of the second image data comprises maximizing the second component of the second image data and the third component of the second image data according to a maximum value depending on the first component of the second image data, wherein the maximum value is proportional to the first component of the second image data.

9. The device of claim 8, wherein the maximum value further depends on the first component of the second image data.

10. The device of claim 7, wherein the first component of the first image data is obtained from gamma-compressed components of the first image data, and wherein a power of two is used to linearize the gamma-compressed components when the gamma-compressed components were gamma-compressed using a value different from two.

11. The device of claim 7, further comprising an apparatus for encoding the first image data in a form of the second image data obtained from the first image data and metadata.

12. The device of claim 7, wherein the first image data and the second image data are in YUV format, each first component is a luminance component, each second component is a first chrominance component, and each third component is a second chrominance component.

13. A non-transitory computer-readable storage medium having stored instructions that, when executed by a processor, cause the processor to perform:
obtaining a second image data from a first image data, wherein a dynamic range of a luminance component of the first image data is greater than a dynamic range of a luminance component of the second image data, wherein obtaining comprises:
deriving a first component of the second image data by applying a tone mapping function to a first component of the first image data, wherein the first component of the first image data is representative of a first linear light luminance, and wherein the first component of the second image data is representative of a second linear light luminance; and
deriving, based on the first component of the first image data, a second component of the second image data and a third component of the second image data by multiplying information representative of a second component of the first image data and information representative of a third component of the first image data, respectively, by a scaling factor that depends on a result of applying an inverse tone mapping function to information representative of the first component of the second image data, the inverse tone mapping function being representative of an inverse of the tone mapping function.

14. The non-transitory computer-readable storage medium of claim 13, wherein deriving the second component of the second image data and the third component of the second image data comprises maximizing the second component of the second image data and the third component of the second image data according to a maximum value depending on the first component of the second image data, wherein the maximum value is proportional to the first component of the second image data.

15. The non-transitory computer-readable storage medium of claim 13, wherein the first image data and the second image data are in YUV format, each first component is a luminance component, each second component is a first chrominance component, and each third component is a second chrominance component.

16. The non-transitory computer-readable storage medium of claim 13, wherein the maximum value further depends on the first component of the second image data.

17. The non-transitory computer-readable storage medium of claim 13, wherein the first component of the first image data is obtained from gamma-compressed components of the first image data, and wherein a power of two is used to linearize the gamma- compressed components when the gamma-compressed components were gamma-compressed using a value different from two.

18. The non-transitory computer-readable storage medium of claim 13, wherein the first image data is encoded in a form of the second image data obtained from the first image data and metadata.

\* \* \* \* \*